US012601282B2

(12) United States Patent
Kumar et al.

(10) Patent No.: US 12,601,282 B2
(45) Date of Patent: Apr. 14, 2026

(54) TURBOFAN GAS TURBINE ENGINE WITH INNER RING REINFORCING STRUCTURE AND METHODS OF PRODUCING THE SAME

(71) Applicant: HONEYWELL INTERNATIONAL INC., Charlotte, NC (US)

(72) Inventors: Avinash Kumar, Bangalore (IN); Tirumala Koka, Bangalore (IN); Milind Khare, Hyderabad (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/603,384

(22) Filed: Mar. 13, 2024

(65) Prior Publication Data

US 2025/0243786 A1 Jul. 31, 2025

(30) Foreign Application Priority Data

Jan. 30, 2024 (IN) ............................ 202411005956

(51) Int. Cl.
*F01D 25/26* (2006.01)
*F01D 21/04* (2006.01)

(52) U.S. Cl.
CPC ........... *F01D 25/26* (2013.01); *F01D 21/045* (2013.01); *F05D 2220/32* (2013.01); *F05D 2230/60* (2013.01); *F05D 2240/14* (2013.01)

(58) Field of Classification Search
CPC ........ F01D 21/045; F01D 25/24; F01D 25/26; F04D 29/526; F05D 2220/32; F05D 2240/14; F05D 2230/60
See application file for complete search history.

(56) References Cited

U.S. PATENT DOCUMENTS

| | | | |
|---|---|---|---|
| 2004/0141837 A1 | 7/2004 | McMillan et al. | |
| 2014/0064938 A1 | 3/2014 | Eriksen et al. | |
| 2018/0066675 A1 | 3/2018 | Kappes et al. | |
| 2018/0163562 A1 | 6/2018 | Khare et al. | |
| 2018/0202460 A1 | 7/2018 | Kray | |
| 2020/0271015 A1* | 8/2020 | Fabre | B32B 1/00 |
| 2021/0246807 A1 | 8/2021 | Caulfeild | |

(Continued)

FOREIGN PATENT DOCUMENTS

EP 0626502 B1 11/1994

*Primary Examiner* — Elton K Wong

(74) *Attorney, Agent, or Firm* — Ingrassia, Fisher & Lorenz LLP

(57) ABSTRACT

Turbofan gas turbine engines and methods are provided. The engines include a fan assembly having an engine rotor hub with fan blades extending radially therefrom configured for rotation of the fan blades, a fan housing structure encircling the fan assembly and including an inner ring that defines an exposed inner surface of the fan housing structure that includes a radially protruding section that defines a recess facing the fan blades and encircling tips thereof, a fan containment structure within the fan housing structure positioned circumferentially around the fan assembly and axially encircling the radially protruding section, and a reinforcing structure fixed to or integrated with an annular portion of the inner ring that is configured to provide greater impact resistance to the forward end of the radially protruding section relative to an aft end thereof.

20 Claims, 7 Drawing Sheets

(56) References Cited

U.S. PATENT DOCUMENTS

| | | | | |
|---|---|---|---|---|
| 2022/0333501 | A1 | 10/2022 | Rainous et al. | |
| 2023/0108929 | A1* | 4/2023 | Kray | F04D 29/526<br>415/220 |

* cited by examiner

TURBOFAN GAS TURBINE ENGINE WITH INNER RING REINFORCING STRUCTURE AND METHODS OF PRODUCING THE SAME

CROSS REFERENCE TO RELATED APPLICATION

This application claims priority to India Provisional Patent Application No. 202411005956, filed Jan. 30, 2024, the entire content of which is incorporated by reference herein.

TECHNICAL FIELD

The present invention generally relates to gas turbine engines, and more particularly relates to turbofan gas turbine engines having inner rings with reinforcement structures that promote operation of fan containment structures of the engines.

BACKGROUND

During operation of a gas turbine engine, an unlikely event, referred to as a “fan blade out” (FBO) event, could occur and refers to a highly unlikely situation where one or more fan blades break or detach from the fan rotor. Should an unlikely FBO event occur, it can have serious implications for the engine’s performance.

Modern gas turbine engines include robust containment structures around the fan section to prevent the broken fan blades from penetrating other engine components or escaping from the engine casing. However, due to the severity of postulated FBO events, there is an ongoing desire to further enhance the reliability and safety of gas turbine engines. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various examples, a turbofan gas turbine engine is provided that includes a fan assembly that includes an engine rotor hub with fan blades extending radially therefrom, the fan assembly configured for rotation of the fan blades about an axis of rotation, a fan housing structure encircling the fan assembly and including an inner ring that defines an exposed inner surface of the fan housing structure facing the fan blades of the fan assembly, wherein the inner ring includes a radially protruding section that defines a recess on the exposed inner surface thereof encircling tips of the fan blades, a fan containment structure within the fan housing structure positioned circumferentially around the fan assembly and axially encircling the radially protruding section, and a reinforcing structure fixed to or integrated with an annular portion of the inner ring disposed at a forward end of the radially protruding section. The reinforcing structure is positioned to be axially encircled by the fan containment structure and forward of the tips of the fan blades. The reinforcing structure is configured to provide greater impact resistance to the forward end of the radially protruding section relative to an aft end of the radially protruding section that is not in contact with the reinforcing structure.

In various examples, a method of producing a turbofan gas turbine engine is provided that includes assembling a fan assembly that includes an engine rotor hub with fan blades extending radially therefrom, the fan assembly configured for rotation of the fan blades about an axis of rotation, assembling a fan housing structure encircling the fan assembly and including an inner ring that defines an exposed inner surface of the fan housing structure facing the fan blades of the fan assembly, wherein the inner ring includes a radially protruding section that defines a recess on the exposed inner surface thereof encircling tips of the fan blades, securing a fan containment structure within the fan housing structure positioned circumferentially around the fan assembly and axially encircling the radially protruding section, and promoting greater impact resistance to a forward end of the radially protruding section relative to an aft end of the radially protruding section by disposing a reinforcing structure at the forward end of the radially protruding section, wherein the reinforcing structure is fixed to or integrated with an annular portion of the inner ring, positioned to be axially encircled by the fan containment structure, and positioned forward of the tips of the fan blades.

Furthermore, other desirable features and characteristics of the turbofan gas turbine engine and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, embodiments of the present disclosure include gas turbine engines having reinforcement structures that promote operation of fan containment structures thereof. The reinforcement structures are configured to modify a trajectory of a radially propelled fan blade in the unlikely event that such fan blade is released from a fan rotor hub thereof. The trajectory is intended to be modified to reduce forward axial motion of the released fan blade. In some examples, the reinforcing structures are fixed to or integrated with annular portions of inner rings of the gas turbine engines.

Figure 2:
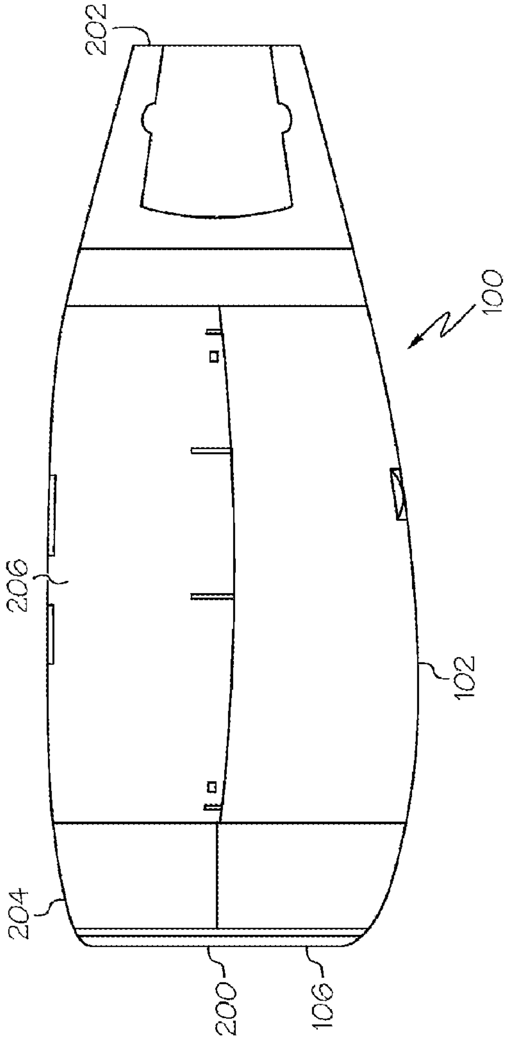
FIGS. 1 and 2 are front and side views, respectively, of a turbofan gas turbine engine in accordance with an embodiment.
Figure 1:
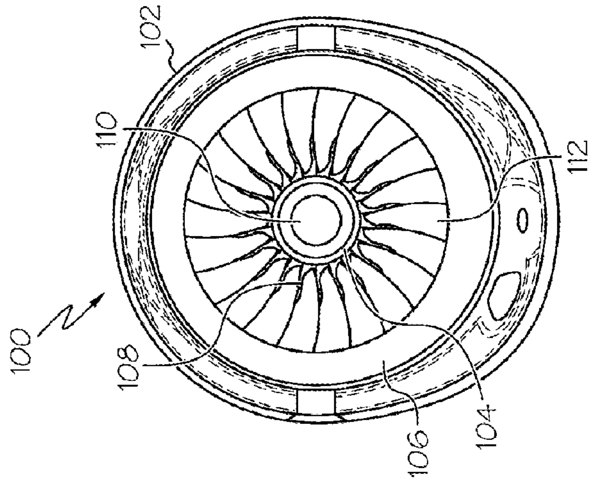

Referring to FIGS. 1 and 2, front and side views of an exemplary turbofan gas turbine engine 100 is illustrated. The engine 100 is a component of an aircraft's propulsion system. It includes an aerodynamically smooth outer covering referred to as a nacelle cowling 102 that wraps around and substantially encases internal components of the engine 100. The nacelle cowling 102 is typically wider at the front or inlet end 200 of the engine 100 and narrower at the back or exhaust end 202 of the engine 100. A nacelle inlet assembly 204 circumscribes the inlet cavity 112 and is radially spaced from an engine centerline (e.g., engine centerline 300 of FIG. 3). A subcomponent of the nacelle inlet assembly 204 is a nacelle inlet forward compartment 106. The engine fan assembly 104 includes a plurality of fan blades 108 that are attached to, and extend radially out from, a fan rotor hub 110 centered within inlet cavity 112. In various embodiments, an engine fan housing structure 206 is attached to the nacelle cowling 102.

Figure 3:
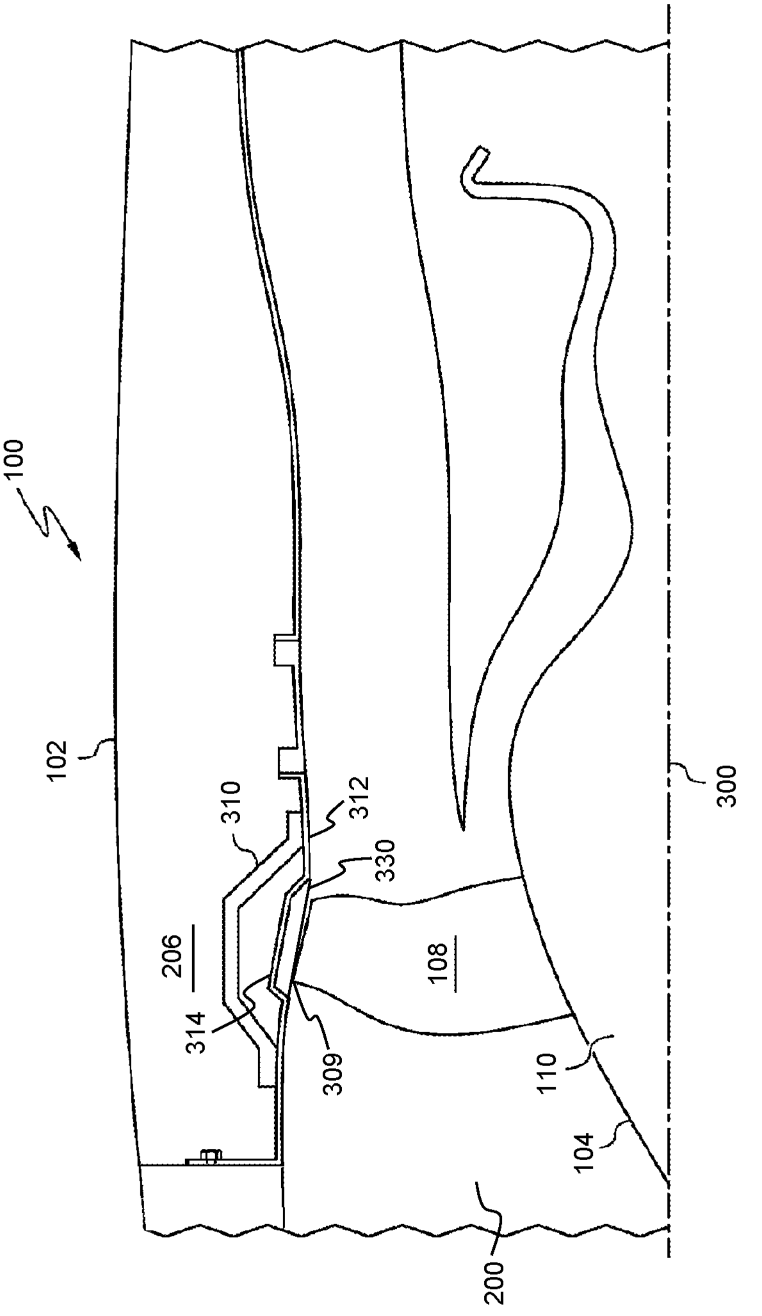
FIG. 3 is a partial cross-sectional view of the turbofan gas turbine engine of FIGS. 1 and 2 and representing certain components thereof in accordance with an embodiment.

FIG. 3 is a cross-sectional view of a portion of the engine 100 shown in FIGS. 1 and 2. Only the upper half of the engine 100, delineated by centerline 300, is shown for clarity. As can be seen, the engine fan assembly 104, including the fan rotor hub 110 and a plurality of the fan blades 108 (only one of which is shown in FIG. 3), is positioned for rotation such that the tips of the fan blades 108 are accommodated within a fan containment structure 310 that is positioned circumferentially around the fan rotor hub 110 to protect the aircraft from damage by the fan blades 108 in the unlikely event that one of the fan blades 108 is released from the fan rotor hub 110. In some examples, a leading edge of each of the fan blades 108 extends further radially from the axis of rotation (e.g., the centerline 300) than a trailing edge of each of the fan blades 108. In some examples, the engine fan assembly 104 may be a blisk fan assembly (e.g., fan blades 108 and a disk are integrated or integral) or an inserted disk fan assembly (e.g., fan blades 108 are inserted into slots of a disk).

The fan housing structure 206 includes an inner ring 312 that defines an exposed inner surface of the fan housing structure 206 facing the fan blades 108 of the engine fan assembly 104. The inner ring 312 includes a radially protruding section 314 that defines a recess on the exposed inner surface thereof encircling the tips 309 of the fan blades 108. In some examples, the radially protruding section 314 has a first diameter at a forward end (labeled 416 in FIGS. 4 and 5) of the radially protruding section 314 that is greater than a second diameter at an aft end (labeled 418 in FIG. 4) of the radially protruding section 314. An abradable material 330 may be disposed within the recess.

Figure 4:
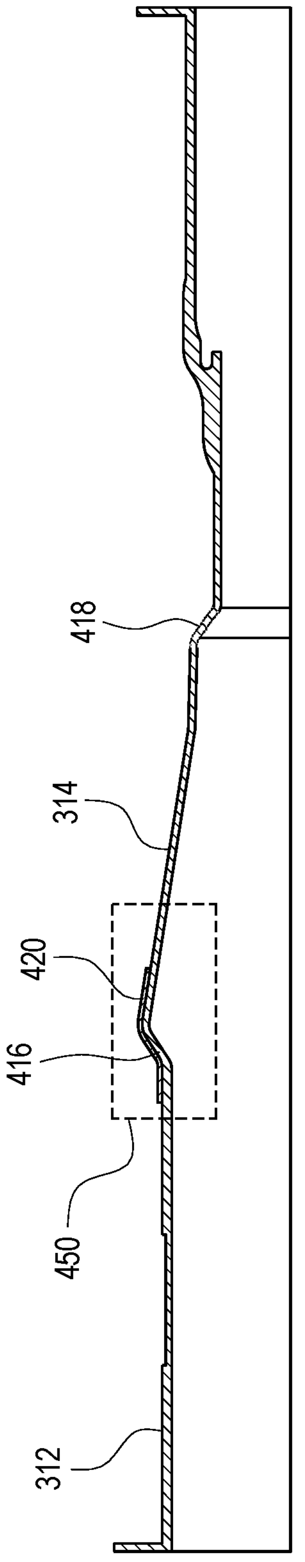
FIG. 4 is a partial cross-sectional view of an inner ring of the turbofan gas turbine ending of FIGS. 1-3 in accordance with an embodiment.
Figure 5:
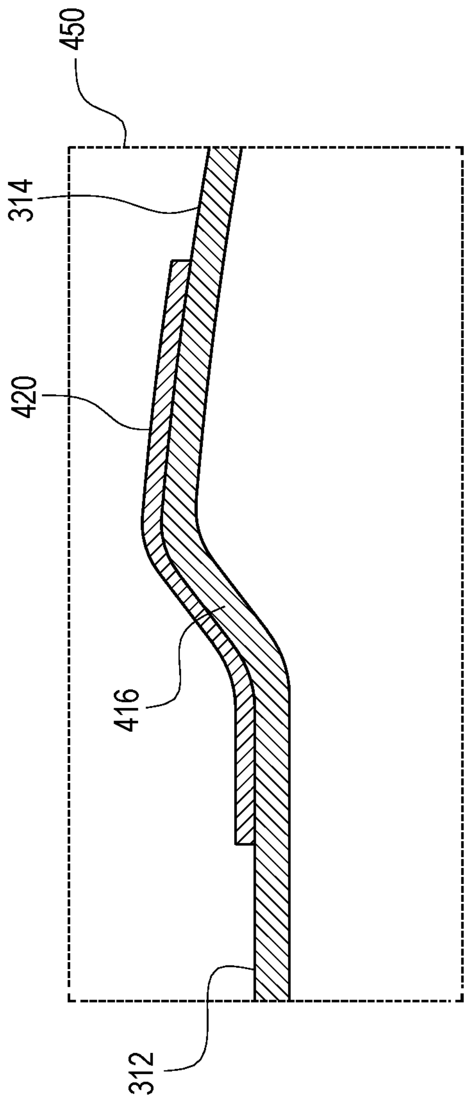
FIG. 5 is an enlarged view of a portion of the inner ring of FIG. 4 in accordance with an embodiment.

Referring now to FIGS. 4 and 5, and with continuing reference to FIGS. 1-3, enlarged views of the radially protruding section 314 are presented. Various components of the engine 100 are omitted from FIGS. 4 and 5 for clarity. In this example, the radially protruding section 314 may include a forward end 416 disposed closest to the inlet end 200 of the engine 100 and an aft end 418 closest to the exhaust end 202 of the engine 100.

In this example, a reinforcing structure 420 is positioned within and axially encircled by the fan housing structure 206, and more specifically, axially encircled by the fan containment structure 310. As represented in FIGS. 4 and 5, the reinforcing structure 420 is positioned adjacent to (e.g., disposed on) and in direct contact with an annular outer surface of the radially protruding section 314 at the forward end 416 thereof. The reinforcing structure 420 may extend about an entirety of the circumference of the outer surface of the radially protruding section 314 and may be contoured to the curvature of all or a portion of the forward end 416 of the radially protruding section 314. FIG. 5 presents an enlarged view of a portion the forward end 416 that includes the reinforcing structure 420 (bound by a box 450 in FIG. 4). The reinforcing structure 420 is configured to provide greater impact resistance at the forward end 416 of the radially protruding section 314 than an impact resistance at the aft end 418 of the radially protruding section 314 that is not reinforced or in contact with the reinforcing structure 420.

Experimental investigations leading to certain aspects of this disclosure indicated that, in the unlikely event that one of the fan blades 108 or a portion thereof is detached from the engine rotor hub 110, the released fan blade (referred to as the released fan blade (labeled as 608 in FIG. 6)) may move in an axial direction due to interactions with the inner ring 312, the fan containment structure 310, and/or a trailing fan blade 108, in addition to being radially propelled due to centrifugal forces. For example, contact between the tip 309 of the released fan blade 608 and the inner ring 312 and/or the fan containment structure 310 may result in a forward axial force on the tip 309. The released fan blade 608 may contact the trailing fan blade 108 resulting in an aft axial force on a suction side face of the released fan blade 608. In the experimental investigations, the forward force tended to be greater than the aft force, resulting in a net forward axial movement.

To modify the trajectory of the released fan blade 608, the reinforcing structure 420 is configured to resist impact by the released fan blade 608 and thereby reduce forward axial motion of the released fan blade 608. In some examples, the reinforcing structure 420 is disposed forward of tips 309 of the fan blades 108. The forward axial motion of the released fan blade 608 may be reduced, for example, by the reinforcing structure 420 increasing a radial thickness of the portion of the inner ring 312 in contact therewith, by the reinforcing structure 420 having a greater material strength than adjacent portions of the inner ring 312, and/or by the reinforcing structure 420 having an S-shaped radial surface facing the engine centerline 300 as represented in FIGS. 4 and 5 which functions as a physical barrier to forward axial motion of the released fan blade 608.

Figure 6:
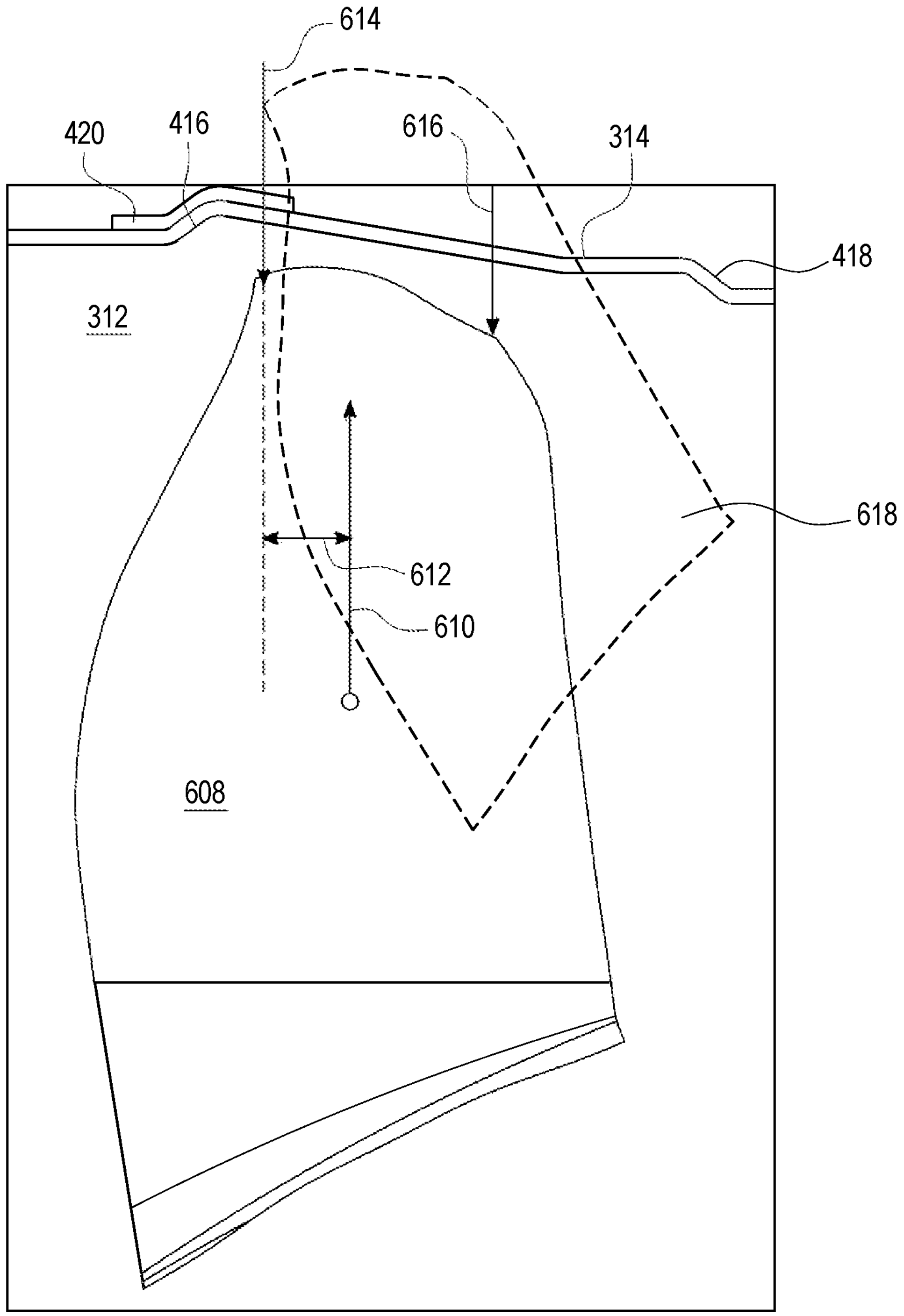
FIG. 6 is a partial cross-sectional view of a turbofan gas turbine engine illustrating radially movement of a released fan blade in accordance with an embodiment.

FIG. 6 illustrates an exemplary trajectory of the released fan blade 608. The centrifugal force is represented by a radially outward extending first arrow 610 (extending from a center of mass of the fan blade 608), and a pair of forces exerted on leading and trailing edges of the released fan blade 608 due to interaction with the inner ring 312 are represented by radially inward extending second and third arrows 614 and 616. In this example, the force represented with the second arrow 614 is greater than the force represented with the third arrow 616 (indicated by the relative lengths thereof) due to the presence of the reinforcing structure 420. An offset 612 between the first arrow 610 (i.e., the centrifugal force) and the second arrow 614 (i.e., the force applied to the leading edge of the released fan blade 608 by the inner ring 312 and/or the reinforcing structure 420) and/or the difference in the magnitudes of the forces represented by the second and third arrows 614 and 616 result in rotation of the released fan blade 608 in a counter-clockwise direction as viewed from the orientation of FIG. 6. This rotation of the released fan blade 608 is represented by a phantom outline 618 of the released fan blade 608.

Figure 7:
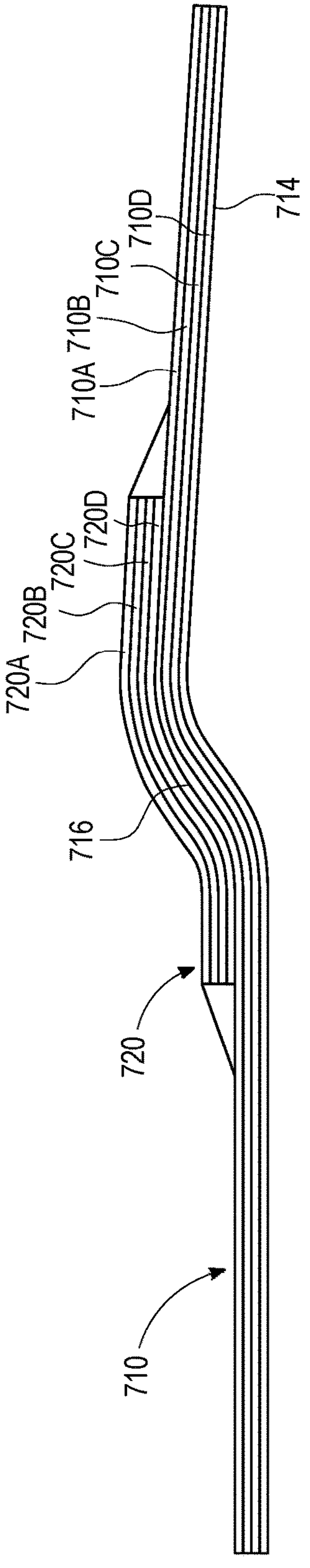
FIGS. 7, 8, and 9 are cross-sectional views of multilayer structures including portions of an inner ring of a turbofan gas turbine engine and one or more layers of a reinforcing structure fixed to or integrated therewith in accordance with various embodiments.
Figure 8:
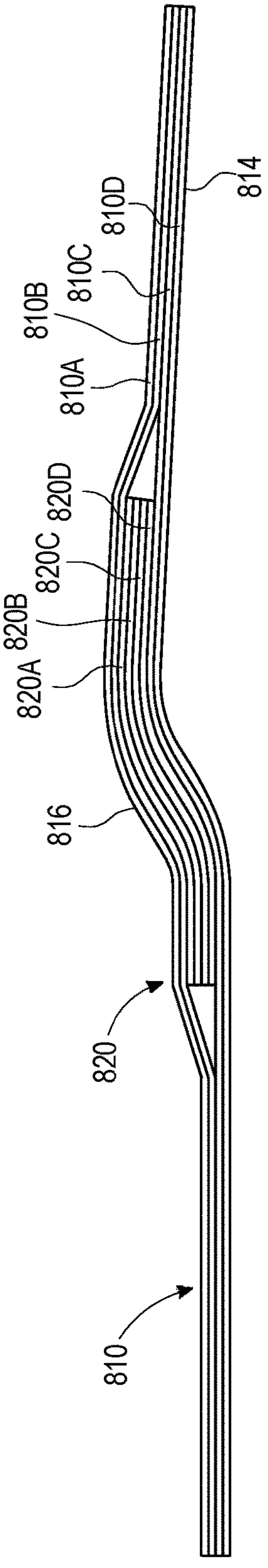
Figure 9:
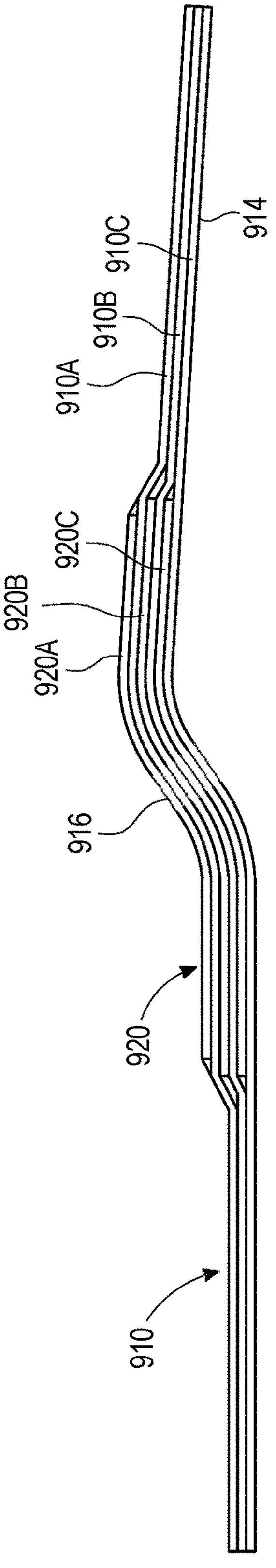

In some examples, the reinforcing structure 420 and/or portions of the inner ring 312 in contact therewith may include multilayer structures. FIGS. 7, 8, and 9 present cross-sectional views of exemplary multilayer structures of inner rings and reinforcing structures.

In FIG. 7, an inner ring 710 includes four layers 710A, 710B, 710C, and 710D and a reinforcing structure 720 includes four layers 720A, 720B, 720C, and 720D. In this example, the radially innermost layer 720D of the reinforcing structure 720 is disposed on the radially outermost layer 710A of the inner ring 710 overlapping a forward end 716 of a radially protruding section 714 of the inner ring 710.

In FIG. 8, an inner ring 810 includes four layers 810A, 810B, 810C, and 810D and a reinforcing structure 820 includes four layers 820A, 820B, 820C, and 820D. In this example, all four layers 820A-820D of the reinforcing structure 820 are disposed between the radially outer layers 810A and 810B and the radially inner layers 810C and 810D of the inner ring 810. As such, the layers 820A-D of the reinforcing structure 820 are integrated into a forward end 816 of a radially protruding section 814 of the inner ring 810.

In FIG. 9, an inner ring 912 includes three layers 912A, 912B, and 912C and a reinforcing structure 920 includes three layers 920A, 920B, and 920C. In this example, the layers 912A-C of the inner ring 910 and the layers 920A-C of the reinforcing structure 920 are radially alternated to have an order, from radially outermost to radially innermost, of the layer 920A of the reinforcing structure 920, the layer 912A of the inner ring 912, the layer 920B of the reinforcing structure 920, the layer 912B of the inner ring 912, the layer 920C of the reinforcing structure 920, and the layer 912C of the inner ring 912. As such, the layers 920A-C of the reinforcing structure 920 are integrated into a forward end 916 of a radially protruding section 914 of the inner ring 912.

Figure 10:
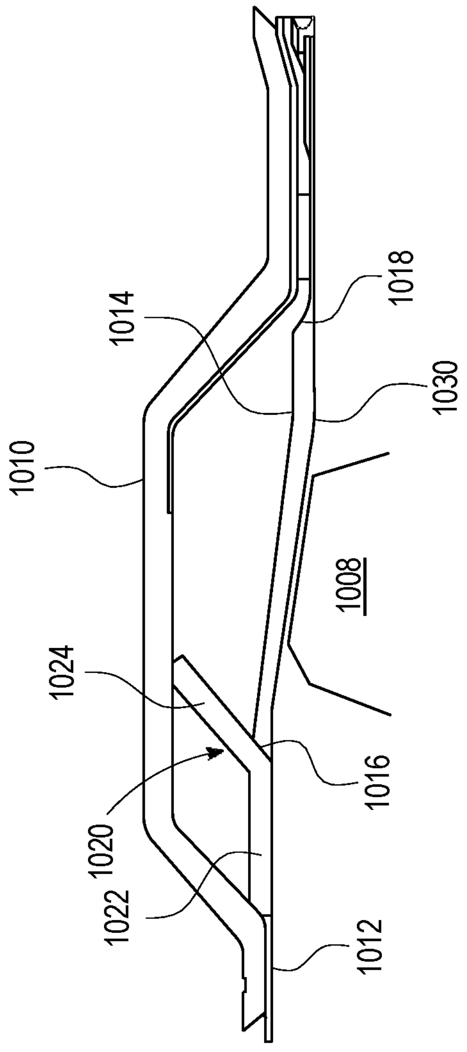
FIG. 10 is a partial cross-sectional view of a fan containment zone of a turbofan gas turbine engine in accordance with an embodiment.

In the examples of FIGS. 4-9, the reinforcing structures 420, 720, 820, and 920 are disposed to overlap or are integrated into the forward ends 416, 716, 816, and 916 of the radially protruding sections 314, 714, 814, and 914 of the inner rings 312, 712, 812, and 912, respectively. However, the reinforcing structure is not limited to any of these examples and other configurations are possible. For example, FIG. 10 presents a reinforcing structure 1020 that is a conical cap or a two-member brace disposed within a containment zone defined between a fan containment structure 1010 and an inner ring 1012. In this example, the reinforcing structure 1020 includes a first portion 1022 extending axially along the inner ring 1012 and having a first end contacting the fan containment structure 1010 at a first point and a second end contacting a forward end 1016 of a radially protruding section 1014 of the inner ring 1012, and a second portion 1024 extending radially from the inner ring 1012 and coupled to the second end of the first portion 1022 and extending therefrom to contact the fan containment structure 1010 at a second point. With this configuration, the forward end 1016 is braced from a radially outward surface by the reinforcing structure 1020 and the fan containment structure 1010.

Figure 11:
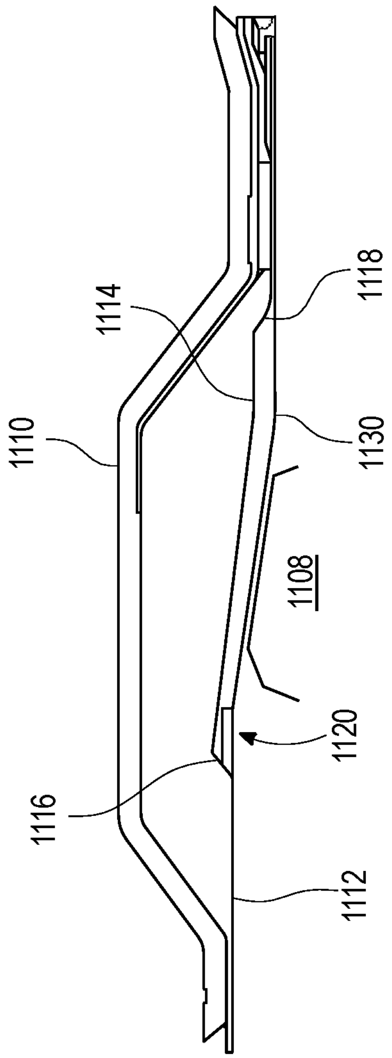
FIG. 11 is a partial cross-sectional view of a fan containment zone of a turbofan gas turbine engine in accordance with an embodiment.

As another example, FIG. 11 presents a reinforcing structure 1120 that is an insert disposed within a recess defined by a radially protruding section 1114 of an inner ring 1112. In this example, the reinforcing structure 1120 may be embedded in, in contact with, or adjacent to an abradable material 1130 disposed within the recess. With this configuration, a forward end 1116 of the radially protruding section 1114 is protected from direct impact by radially propelled objects due to the presence of the reinforcing structure 1120.

Figure 12:
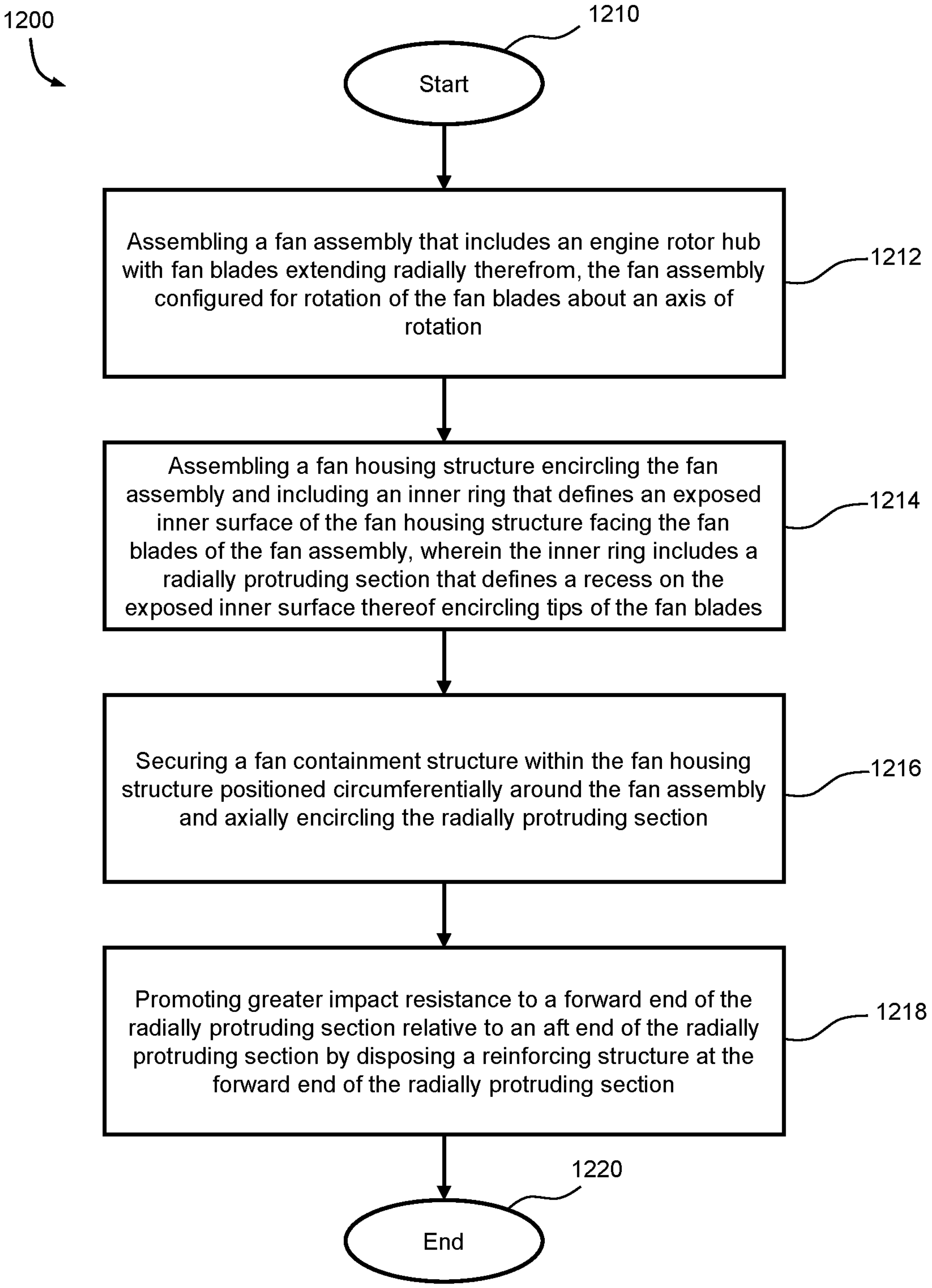
FIG. 12 is a flowchart illustrating an exemplary method for coupling components of a gas turbine engine in accordance with an embodiment.

The reinforcement structures, engines, and engine components comprising the reinforcement structures disclosed herein, including the engine 100, provide for methods of producing a turbofan gas turbine engine. For example, FIG. 12 is a flowchart illustrating an exemplary method 1200. The method 1200 may start at 1210.

At 1212, the method 1200 may include assembling a fan assembly that includes an engine rotor hub with fan blades extending radially therefrom, the fan assembly configured for rotation of the fan blades about an axis of rotation.

At 1214, the method 1200 may include assembling a fan housing structure encircling the fan assembly and including an inner ring that defines an exposed inner surface of the fan housing structure facing the fan blades of the fan assembly, wherein the inner ring includes a radially protruding section that defines a recess on the exposed inner surface thereof encircling tips of the fan blades. The inner ring may include and/or be formed of various materials including certain metallic and composite materials (e.g., polymeric matrix with Kevlar reinforcing fibers). In some examples, the inner ring may include a multilayer structure having more than one layer.

At 1216, the method 1200 may include securing a fan containment structure within the fan housing structure positioned circumferentially around the fan assembly and axially encircling the radially protruding section.

At 1218, the method 1200 may include promoting greater impact resistance to a forward end of the radially protruding section relative to an aft end of the radially protruding section by disposing a reinforcing structure at the forward end of the radially protruding section, wherein the reinforcing structure is fixed to or integrated with an annular portion of the inner ring, positioned to be axially encircled by the fan containment structure, and positioned forward of the tips of the fan blades. The reinforcing structure may include and/or be formed of various materials including certain metallic and composite materials (e.g., polymeric matrix with Kevlar reinforcing fibers). The reinforcing structure may include or be formed of the same or different materials than the inner ring. In some examples, the reinforcing structure may include a multilayer structure having more than one layer.

Various methods may be used to produce the reinforcing structure and install the reinforcing structure within the turbofan gas turbine engine. In some examples, the inner ring includes one or more layers of a first composite material and the reinforcing structure includes one or more layers of the first composite material or a second composite material.

In such examples, the reinforcing structure may be formed directly on the inner ring layer-by-layer or first produced separately as a layer stack and then bonded to the inner ring. In various examples, the reinforcing structure may be disposed between layers of the inner ring, such as represented in the examples for FIGS. 7 and 8). Therefore, the method 1200 may include forming at least a first layer of the inner ring of the fan housing structure, disposing one or more layers of the reinforcing structure on the first layer of the inner ring, and forming at least a second layer of the inner ring on the one or more layers of the reinforcing structure. In some examples, these steps may be repeated to produce structures having multiple layers of the reinforcing structure, at least some of which are enclosed by layers of the inner ring.

In some examples, the inner ring may be formed of a first metallic material and the reinforcing structure may be formed of the first metallic material or a second metallic material. In such examples, the reinforcing structure may be formed directly on the inner ring by, for example, an additive manufacturing process or a machining process or produced separately and then secured to or adjacent to the inner ring.

The method 1200 may end at 1220.

The systems and methods disclosed herein provide various benefits over certain existing systems and methods. For example, in the unlikely event that a fan blade is released from the engine rotor hub during operation of the engine, the reinforcing structure is configured to reduce forward axial movement of the released fan blade, thereby reducing the likelihood of the released fan blade escaping containment and/or providing for a reduction in size of the fan containment structure.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbofan gas turbine engine, comprising:

a fan assembly that includes an engine rotor hub with fan blades extending radially therefrom, the fan assembly configured for rotation of the fan blades about an axis of rotation;

a fan housing structure encircling the fan assembly and including an inner ring that defines an exposed inner surface of the fan housing structure facing the fan blades of the fan assembly, wherein the inner ring includes a radially protruding section that defines a recess on the exposed inner surface thereof encircling tips of the fan blades;

a fan containment structure within the fan housing structure positioned circumferentially around the fan assembly and axially encircling the radially protruding section; and a reinforcing structure fixed to or integrated with an annular portion of the inner ring and disposed at a forward end of the radially protruding section, wherein the reinforcing structure is positioned to be axially encircled by the fan containment structure and forward of the tips of the fan blades, wherein the reinforcing structure is configured to provide greater impact resistance to the forward end of the radially protruding section relative to an aft end of the radially protruding section that is not in contact with the reinforcing structure.

2. The turbofan gas turbine engine of claim 1, wherein the reinforcing structure is configured to reduce forward axial motion of an object that impacts the reinforcing structure.

3. The turbofan gas turbine engine of claim 1, wherein the reinforcing structure defines an S-shaped surface at the forward end of the radially protruding section.

4. The turbofan gas turbine engine of claim 1, wherein the reinforcing structure includes a first portion extending axially along the inner ring and having a first end contacting the fan containment structure at a first point and a second end contacting the forward end of the radially protruding section, and a second portion extending radially from the inner ring and coupled to the second end of the first portion and extending therefrom to contact the fan containment structure at a second point.

5. The turbofan gas turbine engine of claim 1, wherein an abradable material is disposed within the recess of the radially protruding section, wherein the reinforcing structure is positioned within the recess adjacent to the forward end of the radially protruding section.

6. The turbofan gas turbine engine of claim 1, wherein the reinforcing structure includes two or more layers of a composite material fixed to or integrated with the inner ring.

7. The turbofan gas turbine engine of claim 1, wherein the inner ring of the fan housing structure is formed of a metallic material.

8. The turbofan gas turbine engine of claim 1, wherein the inner ring of the fan housing structure is formed of a composite material.

9. The turbofan gas turbine engine of claim 1, wherein the inner ring of the fan housing structure includes at least a first layer and a second layer, and the reinforcing structure is disposed between the first layer and the second layer of the inner ring.

10. The turbofan gas turbine engine of claim 1, wherein a first diameter of the forward end of the radially protruding section is greater than a second diameter of the aft end of the radially protruding section.

11. The turbofan gas turbine engine of claim 1, wherein a leading edge of each of the fan blades extends further radially from the axis of rotation than a trailing edge of each of the fan blades.

12. The turbofan gas turbine engine of claim 1, wherein the fan assembly is a blisk fan assembly.

13. The turbofan gas turbine engine of claim 1, wherein the fan assembly is an inserted disk fan assembly.

14. A method of producing a turbofan gas turbine engine, comprising:

assembling a fan assembly that includes an engine rotor hub with fan blades extending radially therefrom, the fan assembly configured for rotation of the fan blades about an axis of rotation;

assembling a fan housing structure encircling the fan assembly and including an inner ring that defines an exposed inner surface of the fan housing structure facing the fan blades of the fan assembly, wherein the inner ring includes a radially protruding section that defines a recess on the exposed inner surface thereof encircling tips of the fan blades;

securing a fan containment structure within the fan housing structure positioned circumferentially around the fan assembly and axially encircling the radially protruding section; and promoting greater impact resistance to a forward end of the radially protruding section relative to an aft end of the radially protruding section by disposing a reinforcing structure at the forward end of the radially protruding section, wherein the reinforcing structure is fixed to or integrated with an annular portion of the inner ring, positioned to be axially encircled by the fan containment structure, and positioned forward of the tips of the fan blades.

15. The method of claim 14, further comprising configuring the reinforcing structure to reduce forward axial motion of an object that impacts the reinforcing structure.

16. The method of claim 14, further comprising configuring the reinforcing structure to define an S-shaped surface at the forward end of the radially protruding section.

17. The method of claim 14, further comprising disposing an abradable material within the recess of the radially protruding section, wherein the reinforcing structure is positioned within the recess adjacent to the forward end of the radially protruding section.

18. The method of claim 14, further comprising:

forming a first layer of the inner ring of the fan housing structure;

disposing the reinforcing structure on the first layer of the inner ring; and forming a second layer of the inner ring on the reinforcing structure.

19. The method of claim 14, wherein the fan assembly is assembled as a blisk fan assembly.

20. The method of claim 14, wherein the fan assembly is assembled as an inserted disk fan assembly.

* * * * *